C. T. HENDERSON.
MOTOR CONTROLLER.
APPLICATION FILED JULY 29, 1913.
1,143,194.
Patented June 15, 1915.
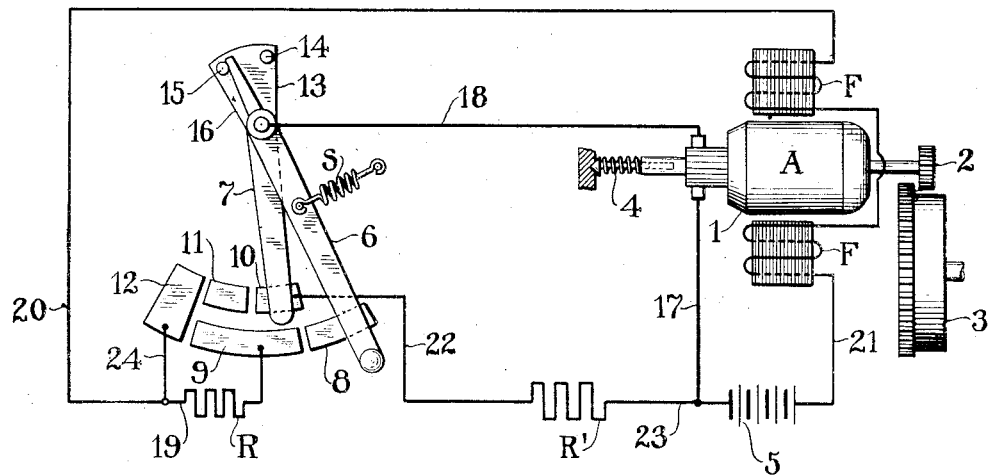
Witnesses
J. L. Johnson
F. H. Hubbard
Inventor
Clark T. Henderson
By Edwin P. H. Tower Jr.
Attorney

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,143,194.      Specification of Letters Patent.      Patented June 15, 1915.

Application filed July 29, 1913. Serial No. 781,726.

*To all whom it may concern:*

Be it known that I, CLARK T. HENDERSON, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

My invention relates to improvements in motor controllers. It is particularly applicable to automobile starters, but it may obviously be used in other relations.

Certain automobile starters employ an electric motor the armature of which is given a lateral play for controlling the mechanical connection with the automobile engine, the lateral movement of the armature in one direction being accomplished by the field magnetism of the motor. To accomplish this attraction of the armature it is desirable upon starting the motor to supply the field winding with a heavy surge of current and as soon as the armature has been centered to reduce the field current. It has also been found desirable to provide one or more steps of acceleration for the motor by armature regulation. Difficulty has, however, been experienced in providing a controller for accomplishing the desired control of the motor in a satisfactory manner. For example, the controllers heretofore proposed increased the field current in stopping the motor as well as in starting the same and this was found very objectionable among other reasons because it often tended to again connect the motor and automobile engine after release thereof.

My invention has among its objects to provide a simple, efficient and reliable controller for motors employed in the aforesaid and other relations. It also has various other objects and advantages which will hereinafter appear.

For the purpose of more fully and clearly disclosing the nature and advantages of my invention I shall describe the embodiment thereof diagrammatically illustrated in the accompanying drawing, it being understood that the controller illustrated susceptible of modification without departing from the scope of the appended claims.

The motor 1 illustrated is of the series type, being provided with an armature A and series field windings F. Fixed to the armature shaft is a pinion 2 adapted to mesh with the teeth of a wheel 3, which it may be assumed is the fly-wheel of an automobile. A spring pressure device 4 normally holds the armatures in a position to disengage the pinion 2 from the wheel 3 while the armature is adapted to be attracted laterally by the field windings F to move the pinion 2 into mesh with the teeth of wheel 3.

For the purpose of illustration I have shown the motor as supplied with current from a storage battery 5 as is customary in automobile starters, although it should be understood that the motor might be supplied with power from any suitable source.

The controller illustrated comprises two concentrically pivoted contact arms 6 and 7. These arms coöperate with contact segments 8, 9, 10, 11 and 12. The segments 8 and 9 are adapted to be engaged by the arm 6 and the segments 10 and 11 by the arm 7, while the segment 12 is common to both arms. The arms are provided with a lost motion connection which, for simplicity of illustration, has been shown as comprising an extension 13 on the arm 7 coöperating with spaced pins 14 and 15 carried by a fan-shaped tail piece 16 provided on the arm 7.

The mechanical arrangement of the parts is as follows: In "off" position the arms 6 and 7 engage segments 8 and 10 respectively as illustrated. Upon movement of the arm 6 to the left said arm first engages segment 9, the arm 7 remaining stationary, and while in engagement with segment 9 moves said arm 7 into engagement with segment 11. Thereafter the two arms move together into engagement with segment 12. Upon reverse operation, the arm 6 first engages segment 9, the arm 7 again remaining stationary and while still in engagement with segment 9 moves said arm 7 into engagement with segment 11. Thereafter the arms 6 and 7 move successively in the order named into engagement with segments 8 and 10 respectively. If desired, the aforesaid reverse operation may be accomplished automatically upon release of the arm 6 by a spring S or other preferred means.

The arm 6, as will hereinafter appear, controls the continuity of the motor circuit and also controls a resistance R in the motor circuit. The arm 7, as will hereinafter appear, controls a shunt around the motor armature including a resistance R′ and also coöperates with the arm 6 in excluding the armature resistance R′ from circuit in stopping the motor.

The arrangement is such that when the arms are in the positions illustrated they will disconnect the motor from circuit and when moved to the left will successively connect the motor in circuit through resistance R with the armature shunted through resistance R′, open said armature shunt and remove the resistance R from circuit. On the reverse operation they successively insert the resistance R in the motor circuit, interrupt the continuity of the motor circuit and reëstablish said armature shunt. It will thus be observed that, due to the armature shunt, the field winding will receive a heavy surge of current governed, of course, by the resistance R′ for attracting the armature laterally in starting and that thereafter the field current is reduced to normal. It will further be observed that in stopping the motor the armature shunt is reëstablished only after the motor is disconnected from circuit.

I shall now describe the specific circuit connections illustrated.

When the arm 6 is moved into engagement with segment 9, circuit is established from one terminal of the battery 5 by conductor 17 through the motor armature A, by conductor 18 to the pivot of both arms, thence through arm 6 to segment 9 and through resistance R by conductors 19 and 20 through the field winding F by conductor 21 to the opposite terminal of the battery. At this time circuit is also closed from conductor 18 through the arm 7 to segment 10 by conductor 22 through resistance R′ by conductor 23 to the right hand terminal of the motor armature, establishing the armature shunt heretofore described. Continued movement of the arm 6 disengages arm 7 from segment 10, thereby interrupting the armature shunt while movement of the arms to final position short-circuits the resistance R from the motor circuit. Under these conditions the motor circuit extends from conductor 18 through both arms 6 and 7 to segment 12 and thence by conductor 24 to conductor 20.

From the foregoing it will be obvious, that the controller illustrated secures the desired control in a very simple, efficient, reliable and convenient manner, necessitating the operation of but a single handle which may be attached either to the free end or hub of the arm 6, as desired. It will also be obvious that the controller may be advantageously used in other relations than that herein specifically set forth.

What I claim as new and desire to secure by Letters Patent is:

1. In combination, a series motor, and controlling means therefor operable in one direction to successively connect the same in circuit and reduce the field strength thereof and in an opposite direction to stop the motor without increasing its field strength.

2. The combination with a series motor, of controlling means therefor adapted in off position to establish connections for insuring a strong field in starting, said means being operable to successively connect the motor in circuit and interrupt said connections and also operable to successively disconnect the motor from circuit and reëstablishing said connections.

3. The combination with an electric motor, of controlling means therefor operable to start said motor with a strong field, then reduce its field strength and thereafter increase the potential of the armature circuit and also operable to decrease the potential of the armature circuit and disconnect said motor from circuit without increasing the field strength thereof.

4. The combination with an electric motor, of controlling means therefor operable to start said motor with a strong field, then reduce its field strength and thereafter increase the potential of the armature circuit and also operable to decrease the potential of the armature circuit and disconnect said motor from circuit without increasing the field strength thereof, said means being controllable by a single operating member movable in opposite directions to start and stop said motor.

5. The combination with a series motor, of controlling means therefor adapted in off position to establish a shunt around the armature of said motor, said means being operable to successively connect said motor in circuit and interrupt said armature shunt and upon return to off position, successively disconnecting the motor from circuit and reëstablishing said armature shunt.

6. The combination with a series motor, of a controlling device therefor adapted in off position to establish a shunt around said motor armature, said device being operable to successively connect said motor in circuit, remove said armature shunt and vary the potential impressed upon said motor and also operable to off position to disconnect said motor from circuit prior to reëstablishment of said armature shunt.

7. The combination with a series motor, of a controlling device therefor adapted in off position to establish a shunt around said motor armature, said device being operable to successively connect said motor in circuit, remove said armature shunt and vary the potential impressed upon said motor and also operable to off position to disconnect said motor from circuit prior to reëstablishment of said armature shunt, said device having a single operating member movable in opposite directions to start and stop said motor.

8. The combination with an electric motor, of a controller therefor comprising two members, one for completing the motor circuit and the other for regulating the field strength, the latter being operable by the former to increase and decrease the field strength but being immovable during the operation of said former member to complete and interrupt the motor circuit.

9. The combination with an electric motor, of a controller therefor comprising two contact members and coöperating contacts therefor, one of said members normally engaging one of said contacts and being movable out of and into engagement therewith by the other member but only after movement of said latter member to respectively engage and disengage another of said contacts.

10. The combination with an electric motor, of a controller therefor comprising two contact members and coöperating contacts therefor, one of said members normally engaging one of said contacts and being movable out of and into engagement therewith by the other member but only after movement of said latter member to respectively engage and disengage another of said contacts, said latter member and said contact engaged thereby controlling the continuity of the motor circuit and said other member and said contact engaged thereby controlling connections for varying the field strength and insuring an increased field strength in starting the motor.

11. In combination, a motor having a laterally movable armature to be centered by its field magnetism and means operable to start said motor with an increased field strength for centering its armature and then reduce the field strength thereof and also operable to stop said motor without increasing its field strength.

12. The combination with a motor having a laterally movable armature to be centered by its field magnetism, of means controllable by a single operating member to connect said motor in circuit with a strengthened field for centering its armature and then reduce its field strength and also operable to stop said motor without increasing the field strength thereof.

13. The combination with a motor having a laterally movable armature to be centered by its field magnetism, of means having a single controlling member operable in one direction to start said motor and effect centering of its armature, then reduce the field strength thereof and then vary the potential impressed thereon and in an opposite direction to disconnect said motor from circuit without strengthening the field thereof.

14. The combination with a series motor having a laterally movable armature to be centered by its field magnetism, of means having a single controlling member operable in one direction to successively start said motor with a shunt around its armature to effect centering of said armature, then interrupt said shunt and vary the potential impressed upon said motor and in an opposite direction to disconnect said motor from circuit without reëstablishment of the armature shunt.

In witness whereof, I have hereunto subscribed my name in the presence of two witnesses.

CLARK T. HENDERSON.

Witnesses:
  F. H. HUBBARD,
  S. F. WATSON.